United States Patent Office 2,826,673
Patented Mar. 11, 1958

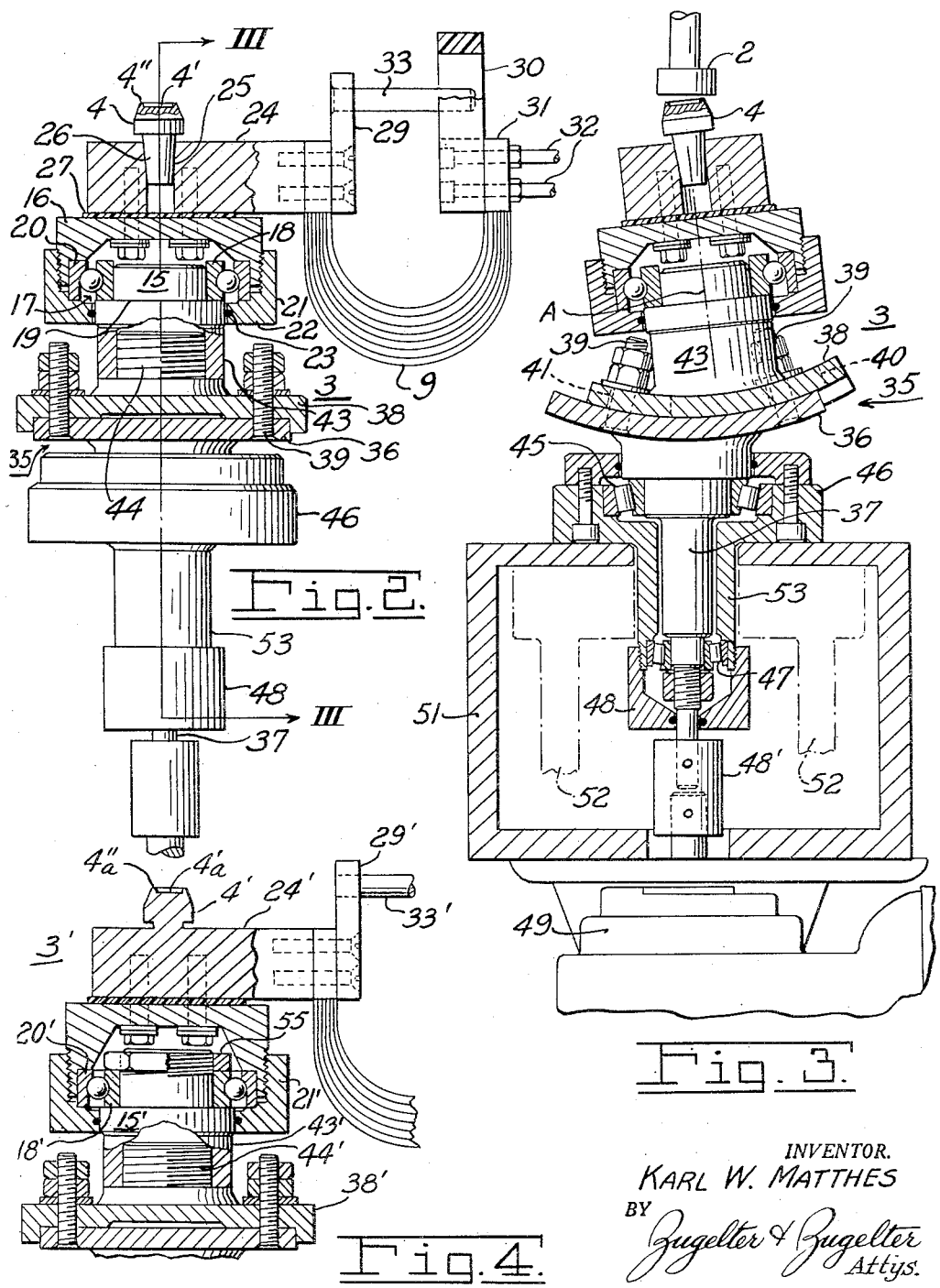

2,826,673

RING SEAM WELDERS

Karl W. Matthes, Golf Manor, Ohio, assignor to Precision Welder and Machine Company, Cincinnati, Ohio, a corporation of Ohio Application January 16, 1956, Serial No. 559,375

3 Claims. (Cl. 219—81)

This invention relates to resistance welders and more particularly to welders designed to produce an annular or ring seam weld.

An object of this invention is to provide an electrode assembly having a motor driven eccentric arrangement whereby the eccentricity of the path of travel of the welding surface of the electrode may be adjusted at will.

A further object of the invention is to provide an electrode assembly as above set forth which is so constructed that it may easily be adapted to existing resistance welders.

Other objects of the invention will be apparent to these of ordinary skill in the art to which the invention pertains from the following description and drawings.

In the drawings:

Fig. 2 is an enlarged view partly in vertical section of the electrode assembly;

Fig. 3 is a view of the electrode assembly in section taken on line III—III of Fig. 2, and mounted in position on the knee of a welder frame; and Fig. 4 is a modified form of a detail embodied in the electrode assembly.

Figure 1:
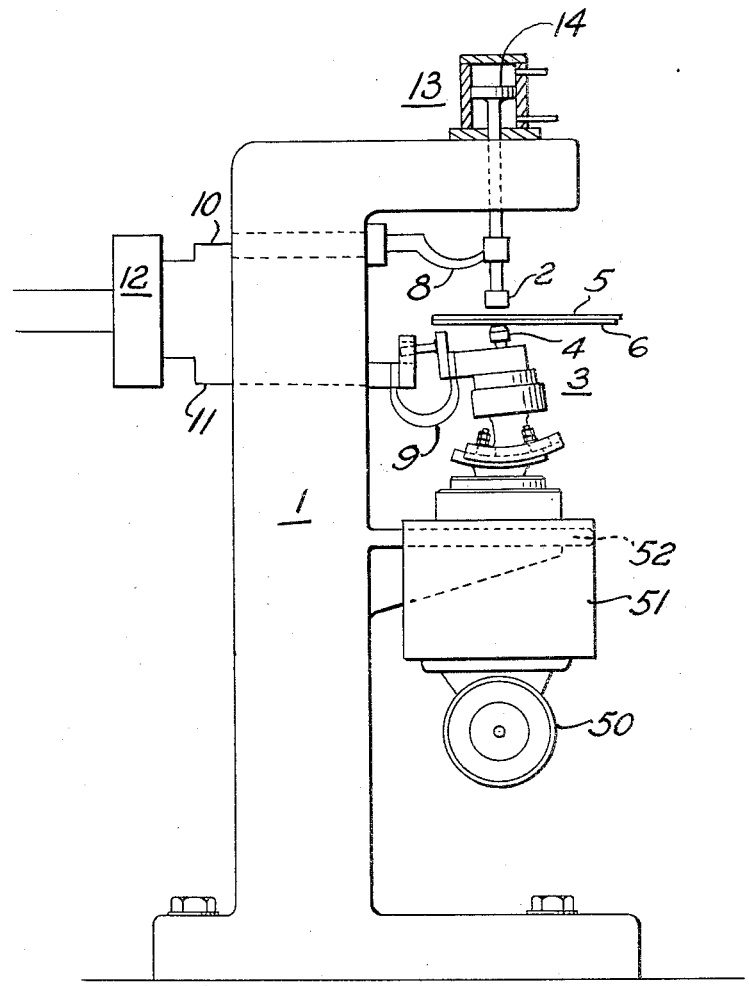
Figure 1 is a view in side elevation of a resistance welder provided with a ring seam welder electrode assembly arranged and constructed in accordance with an embodiment of the invention.

In Fig. 1 of the drawings a resistance welder is shown comprising a frame 1 provided with a movable electrode 2 and an electrode assembly 3 having an electrode 4 that has a wobble motion whereby metal sheets or objects 5 and 6 may be joined by an annular or ring seam weld. As shown more particularly in Figs. 2 and 3, the electrode 4 has a cup or recess 4' in the end thereof whereby an annular relatively sharp lip 4" is formed. When the movable electrode 2 is moved to welding position with pieces to be welded between the electrodes, the lip 4" of electrode 4 makes a point contact with the metal. As the electrode assembly 3 operates, the point of contact travels in a circle whereby a ring or annular seam weld is formed. The point contact while traveling in a circle does not involve rotational movement of the electrode 4.

The electrode assembly, as will be shown infra, is so constructed that the angle between a plane containing the lip 4" and the adjacent face of the electrode 2 may be changed whereby the area of point contact so to speak may be modified according to welding requirements.

The electrode 2 and the assembly 3 are provided with flexible leads 8 and 9 whereby they may be connected to the terminals 10 and 11 of a transformer 12.

Electrode 2 may be actuated to or from welding position by means of a power cylinder 13 having a reciprocating piston 14 therein. Piston 14 may be motivated either pneumatically or hydraulically.

The electrode assembly 3 comprises a spindle 15 having a head 16 thereon that is rotatable relative to the spindle on an anti-friction bearing 17. The inner race 18 of the bearing is pressed on the upper end of the spindle against a shoulder 19 and the outer race 20 is clamped between the head 16 and a retainer ring 21 which is threaded onto an annular flange of head 16 as shown. Ring 21 has an inwardly projecting flange 22 provided with a seal 23 located in a groove in the inner face of the flange as shown. The seal 23 engages the spindle 15.

Head 16 is provided with a terminal block 24 which is bolted thereto as shown. The block is provided with a tapered socket 25 for receiving a tapered shank 26 of electrode 4. Block 24 is insulated from the head 16 by insulation 27. Electrode 4 may of course be made integral with the block 24 if it is so desired. One end of flexible lead 9 is clamped between a block 29 and block 24 by bolts as shown and the other end is secured to a block 30 of insulation which in turn is secured by a terminal block 31 and bolts 32 to the frame 1. A pin 33 which connects blocks 29 and 30 secures block 24 against any tendency to rotate with spindle 15.

Spindle 15 is secured to an adjustable eccentric 35. As shown, the eccentric comprises an arcuate bearing member 36 secured to a driven shaft 37, and an arcuate plate 38 which is adjustably secured by the bolts 39 to member 36. As shown, plate 38 is slotted at 40 and 41 so that the axis of spindle 15 may be adjusted to form an angle on either side of the axis of shaft 37.

Plate 38 is provided with an internally threaded tubular portion 43 into which a threaded shank 44 of spindle 15 is threaded.

Shaft 37 is provided with an anti-friction thrust bearing 45 supported in a shaft housing 46. The lower end of the shaft is journaled in an anti-friction thrust bearing 47 and extends through a cap 48. The portion of the shaft extending out of cap 48 is connected by a coupling 48' to a gear reduction 49. The shaft 37 is driven by a motor 50 through the gear reduction 49.

To facilitate mounting of the electrode assembly 3 on frame 1, an open-ended box-like frame 51 is provided. The frame 51 slides over the knee members 52 of frame 1 and serves as a bearing for the housing 46. As shown, the top and bottom of frame 51 is provided with openings to accommodate the downwardly extending portion 53 of housing 46. The frame 51 supports the motor 50 and the gear reduction 49.

From the foregoing description it will be observed that the head 16, the block 24 and the electrode 4 are stationary with reference to spindles 15 and 37. However, as the motor drives the spindle 37 and the spindle 15 the electrode 4 will wobble and cause the lip 4" to make point contact with the material to be welded which point travels in a circle about the rotational axis of spindle 37 as a center. The sharpness of the point contact may be regulated by adjusting the angle of the axis A of spindle 15 with respect to the rotational axis of spindle 37. If for example axis A is coincident with the rotational axis of spindle 37, then of course the lip 4" will make contact around its entire periphery with the metal between electrode 2 and electrode 4. However, as that angle is changed by sliding the arcuate plate 38 right or left of the rotational center of spindle 37, as viewed in Fig. 3, it will be apparent that the angle between the face of the electrode 4 and the face of electrode 2 may be modified both as to magnitude and direction.

In Fig. 4 is shown a modified form of the electrode assembly 3'. In that assembly corresponding and similar parts are indicated by the same reference characters with primes affixed. There is one exception, namely, that the rim 4" and the recess 4' in Figs. 2 and 3 is designated 4"$_a$ and 4'$_a$, respectively, in Fig. 4. In the modification shown in Fig. 4 the portion of spindle 15 which is received within the race 18' is made longer than in Figs. 2 and 3 and is threaded as shown to accommodate a lock nut 55 which is more positive in its securing of the race 18' against turning. Race 18' should not turn with respect to the spindle 15'. The lock nut shown can be more positive in its securing action than in the case of a press fit. Also as shown in Fig. 4 the electrode 4' is made integral with the block 24' but in other respects it is the same in construction as the electrode 4.

Having thus described the invention it will be apparent to those of ordinary skill in the art to which the invention pertains that various modifications and changes may be made in the illustrated embodiments without departing from either the spirit or the scope of the invention.

Therefore, what is claimed as new and desired to be secured by Letters Patent is:

1. A resistance welder electrode assembly for forming annular or ring seam welds that comprises a spindle adapted to be driven by motor means, a head on the spindle, means for effecting relative rotation of the spindle with respect to said head, means securing the head against rotation, means for adjusting the axis of relative rotation of the head with respect to the spindle, and an electrode on said head having an annular lip that is concentric with the relative axis of rotation of said head, whereby on rotation of the spindle, the lip of the electrode engages a work piece at a point which travels in a circle.

2. An assembly as in claim 1 in which a block is secured to said head and provided with insulation between the same, the electrode has a tapered shank and the head has a tapered socket for receiving said shank to frictionally secure the same to the head.

3. An electrode assembly for forming an annular or ring seam weld, that comprises a first spindle adapted to be driven by a motor, a first arcuate plate on said first spindle, a second spindle having an arcuate plate seated on the first arcuate plate, a head on said first spindle having a bearing therein in which the second spindle is journaled whereby the second spindle may be rotated in said bearing by the first spindle, means for adjusting the position of the arcuate plate of the second spindle on the arcuate plate of the first spindle whereby the axis of the second spindle may be disposed at a fixed but adjustable angle to the axis of the first spindle, an electrode block on said head, means for insulating the block from the head, an electrode on said head having its axis in line with the axis of said second spindle, a flexible electric lead connected to said block, and means for securing said block and head against a tendency to rotate with said second spindle.

References Cited in the file of this patent

UNITED STATES PATENTS

| | | |
|---|---|---|
| 1,196,852 | Fulda | Sept. 5, 1916 |
| 2,254,696 | Gilbert | Sept. 2, 1941 |
| 2,371,303 | Liebowitz | Mar. 13, 1945 |
| 2,418,781 | Lewis | Apr. 8, 1947 |
| 2,474,129 | Tramontini | June 21, 1949 |